(12) United States Patent
Tyagi et al.

(10) Patent No.: US 10,095,308 B2
(45) Date of Patent: Oct. 9, 2018

(54) GESTURE BASED HUMAN MACHINE INTERFACE USING MARKER

(71) Applicant: Centre for Development of Telematics, Bangalore (IN)

(72) Inventors: Vipin Tyagi, Noida (IN); Sridharan B, Bangalore (IN); Pallab Dutta, Bangalore (IN); Maheshkumar Yadavrao Gadge, Bangalore (IN); Giri Babu, Bangalore (IN)

(73) Assignee: Center for Development of Telematics, Bangalore (IN)

( * ) Notice: Subject to any disclaimer, the term of this patent is extended or adjusted under 35 U.S.C. 154(b) by 0 days.

(21) Appl. No.: 15/313,604

(22) PCT Filed: May 20, 2015

(86) PCT No.: PCT/IB2015/053708
§ 371 (c)(1),
(2) Date: Nov. 23, 2016

(87) PCT Pub. No.: WO2015/181685
PCT Pub. Date: Dec. 3, 2015

(65) Prior Publication Data
US 2017/0123494 A1    May 4, 2017

(30) Foreign Application Priority Data
May 24, 2014    (IN) .......................... 2579/CHE/2014

(51) Int. Cl.
*G09G 5/00* (2006.01)
*G06F 3/033* (2013.01)
(Continued)

(52) U.S. Cl.
CPC .............. *G06F 3/014* (2013.01); *G06F 3/005* (2013.01); *G06F 3/017* (2013.01); *G06F 3/167* (2013.01);
(Continued)

(58) Field of Classification Search
CPC ... G06F 3/04883; G06F 3/0488; G06F 3/0481
See application file for complete search history.

(56) References Cited

U.S. PATENT DOCUMENTS 5,483,261 A *  1/1996  Yasutake ............... G06F 3/0425
                                                            178/18.03
2005/0275635 A1* 12/2005  Dehlin ................... G06F 3/011
                                                             345/173
(Continued)

FOREIGN PATENT DOCUMENTS

WO      2011142317  A1    11/2011

OTHER PUBLICATIONS

International Search Report, Application No. PCT/IB2015/053708, 2 pages, dated Sep. 22, 2015.

*Primary Examiner* — Nan-Ying Yang
(74) *Attorney, Agent, or Firm* — Hoffmann & Baron, LLP (57) ABSTRACT

The present disclosure relates to system and method for gesture recognition for emulating a mouse for human machine interface wherein displacements, direction of displacements of cursor as also double click actions of mouse can be emulated by instinctive hand gestures. The method uses a marker as gesture interface and therefore does not depend on hand segmentation techniques, which suffer from deficiencies related to lighting conditions, variation of skin color from person to person and complexities of background.

11 Claims, 7 Drawing Sheets

(51) Int. Cl.
    *G09G 5/08*     (2006.01)
    *G06F 3/041*    (2006.01)
    *G06F 3/01*     (2006.01)
    *G06K 9/00*     (2006.01)
    *G06F 3/00*     (2006.01)
    *G06F 3/16*     (2006.01)
    G06F 3/0482    (2013.01)

(52) U.S. Cl.
    CPC ........ *G06K 9/00355* (2013.01); *G06F 3/0482* (2013.01)

(56) References Cited

U.S. PATENT DOCUMENTS

| | | | | |
|---|---|---|---|---|
| 2010/0303289 | A1* | 12/2010 | Polzin | G06K 9/00342 382/103 |
| 2011/0080339 | A1* | 4/2011 | Sun | G06F 3/017 345/157 |
| 2011/0320978 | A1* | 12/2011 | Horodezky | G06F 3/0488 715/823 |
| 2013/0050076 | A1* | 2/2013 | Hong | G06F 3/017 345/157 |
| 2013/0057469 | A1* | 3/2013 | Ajika | G06F 3/017 345/156 |
| 2014/0347263 | A1* | 11/2014 | Dai | G06F 3/017 345/156 |

\* cited by examiner

GESTURE BASED HUMAN MACHINE INTERFACE USING MARKER

CROSS-REFERENCE TO RELATED APPLICATIONS

This application is a National Stage application of International Application No. PCT/IB2015/053708, filed May 20, 2015, which claims benefit to Indian Application No. 2579/CHE/2014, filed May 24, 2014, which are incorporated by reference herein in their entirety.

BACKGROUND

Field

The present disclosure generally relates to the field of gesture recognition for human machine interface. More specifically, the present disclosure pertains to human machine interface using intuitive gestures using a marker.

Description of the Related Art

Background description includes information that may be useful in understanding the present invention. It is not an admission that any of the information provided herein is prior art or relevant to the presently claimed invention, or that any publication specifically or implicitly referenced is prior art.

Gestures have long been used for communication between human beings. Gestures can originate from any bodily motion or state but commonly originate from face or hand. Human beings have for long used facial expressions to interpret emotions. Simplest gesture using hand is use of figure to point out a direction or a person or an object. A more advanced variation is sign language which human beings are known to have used before they learnt to use spoken language. Subsequently sign language using hand gestures has evolved for use by speech/hearing impaired.

Typically, communication using sign/gestures includes a set of signs/gestures and a set of corresponding meaning/ideas/actions that each of them conveys. Therefore, set of people involved in communication using signs/gestures has to remember and recognize these gestures/signs. Process of learning these may be difficult but can be made easy by using intuitive gestures. For example, gesture of pointing a figure in a direction or person or object for conveying direction/person/object is intuitive, and can be easily used and understood by both the parties.

With the advancement in computing technologies, gestures have gained considerable importance as it was realized that computing and other capabilities now at our disposal can be harnessed to capture and interpret gestures for meaningful purposes such as for communication by speech impaired or for human interface with machines especially for computer illiterates. Current focuses in the field of gesture recognition include emotion recognition from the face and hand gesture recognition specifically in resource constrained embedded systems. Gestures are most often used to input commands to machines.

Gesture recognition is being seen as a way for computers to understand human body language, thus building a richer bridge between machines and humans as against primitive text based user interfaces or even graphical user interfaces, which still limit the majority of input to keyboard and mouse. Thus, gesture recognition capabilities shall enable humans to communicate with machines and interact naturally.

Recognizing gestures as input allows computers to be more accessible for the physically-impaired and can make interaction more natural in gaming or 3-D virtual world environment. Such recognition techniques can also help ease the use of computers for people, such as in villages or rural areas, who are generally not comfortable with other I/O devices such as keyboards/mouse, among other like devices.

Gesture recognition capabilities generally include an image capturing device such as a camera and a software that a processor can use for processing images captured, recognizing and/or interpreting specific gestures. A wave of the hand, for instance, can be interpreted to mean "terminate the program". 2D Camera based hand gesture recognition techniques can be divided into two modules namely, hand posture localization, and hand posture recognition, wherein, in hand posture localization, various parts of hand are identified in the entire image and once user's hand has been segmented, its posture is recognized by using one of the various techniques such as Hidden Markov Models, Haar Transform, Hausdorff Matching approach, Fuzzy Logic, Neural Networks, Template Matching etc. All these are very complex techniques and require considerable processing speed.

Hand segmentation itself can be done by any of the two techniques namely, skin color technique and hand movement technique. In skin color based techniques, skin color regions have to be identified from the image, say by directly keeping the thresholds to Red, Green and Blue color in the RGB image. It can alternately be done by converting the RGB color space to either YCbCr or HSV color or keeping the thresholds. In good lighting situations, these skin color based techniques give correct skin color regions but with poor lighting conditions, different skin regions cannot be identified in an image. Besides this, skin color varies from person to person. It is therefore difficult to identify segments of hand with the limitations of variations in the skin color from person to person and that of different lighting conditions.

The other technique for hand segmentation is based on the hand movements. The limitation with movement based on hand segmentation is that only one hand should move and the background parts should not move. If background parts (e.g. head) are moving, their speed should be slower than the speed of hand used for conveying gestures to the machine.

There is therefore need to have a gesture recognition method, say for emulating a mouse for enabling human machine interface, which gesture recognition does not depend on hand segmentation and works in different lighting conditions, improves recognition accuracy, is neutral to skin colors, and also works with complex backgrounds.

SUMMARY

An object of present disclosure is to overcome problems associated with existing methods of gesture recognition using hand segmentation techniques.

Another object of present disclosure is to provide a method for gesture recognition for enabling human machine interface.

Another object of the disclosure is to provide a method for gesture recognition for mouse emulation with discrete mouse movements.

Another object of present disclosure is to provide a method for gesture recognition using a marker as human-machine interface to make the computers and websites easy to use/access by any user with the help of webpage items intelligence along with audio/visual feedbacks to the user to avoid disappearance of marker from camera scene.

Aspects of present disclosure relate to systems and methods for gesture recognition for enabling human-machine interface, say by emulating a mouse for human machine interface wherein displacements, direction of displacements of cursor, as well as double click actions of mouse can be emulated by hand gestures using marker. One should appreciate that although most of the present disclosure has been explained with reference to mouse emulation, any other I/O hardware such as, joystick, can be implemented through the proposed gesture recognition techniques, all of which are completely covered within the scope of the instant disclosure.

In an aspect of the present disclosure, system and method provide for use of a marker that is configured on/with a user's hand and is used as a gesture interface to emulate, say a mouse function, by enabling a display cursor/pointer to move to a desired location, which can be calculated based on data from plurality of consecutive image frames of the marker movement captured by an image capturing unit and current display/webpage contents. As the proposed marker is configured to emulate one or a combination of I/O devices, any function of the desired/applicable emulated I/O device can be implemented by the proposed gesture recognition techniques. For instance, a mouse emulation can include functions such as scroll, movement of pointer on the screen, change in cursor location, opening/closing/resizing windows/screens/objects, among other functions known in the art.

Another aspect of the present disclosure provides a method of display pointer/cursor movement by gestures of hand, wherein cursor/pointer movement is restricted within various options displayed on monitor/screen of interface unit, making it easier for user to do the selection. For instance, in case the display monitor presents to a user three options on a webpage, one of which has to be selected, the proposed marker based gesture recognition techniques can incorporate restricted movement of the marker only between the three options, and nowhere else on the display, or even if the pointer/cursor/object on the display screen moves outside the three options, calculations can be done to approximate the current position to the closest applicable option. Similarly, upon selection of an option on the current web page, a next web page can be shown, having say five options, and therefore the pointer/cursor movement can be restricted only between these five options.

In another aspect of the present disclosure, movement of the hand/marker outside the range of the image capturing unit can also be alarmed/informed by one or more configurable means to the user so that the user can bring back his hand within the range that is recognizable by the image capturing unit such as the camera.

Thus the present disclosure helps in human machine interface without any I/O hardware such as mouse by using intuitive hand gestures that are easy to understand and implement/incorporate. Also the proposed gesture recognition technique(s) do not suffer from disadvantages associated with other techniques, which depend on hand segmentation and need proper environment by way of proper lighting, uniformity of skin color from person to person and noise free background. The proposed techniques also enhance the efficiency/accuracy of gesture recognition.

Various objects, features, aspects and advantages of the inventive subject matter will become more apparent from the following detailed description of preferred embodiments, along with the accompanying drawing figures in which like numerals represent like components

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DETAILED DESCRIPTION

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and abstract of the disclosure provided herein are for convenience only and do not interpret the scope or meaning of the embodiments.

Reference will now be made in detail to the exemplary embodiments of the present disclosure, examples of which are illustrated in the accompanying drawings. Wherever possible, the same reference numbers are used in the drawings and the description to refer to the same or like parts.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Embodiments of present disclosure describe system and method for human machine interface without physical device wherein gesture recognition technique is used for input commands.

In an embodiment, systems and methods of the present disclosure describe gesture recognition techniques for emulating a mouse for human machine interface, wherein displacements, direction of displacements of cursor and/or pointer on display device, along with other desired/known functions such as double click actions of mouse can be emulated by hand gestures.

In yet another embodiment, gesture recognition technique of the present disclosure incorporate a marker that can be configured on/with a user's hand in an appropriate manner and can enable the user to make intuitive gestures for interface with machine/computer/computing device, wherein the techniques/gestures are easy to understand and implement. For example, a user can move his hand in the direction in which he wants cursor and/or mouse pointer to move, and can also keep his hand fixed/stationery/static for a defined amount of time to enable say a double click action.

In an embodiment, the disclosure further provides a method of capturing images of a marker as it moves along with hand during gesturing, and processing these images to locate and track centroid of marker. In yet another embodiment, the disclosure of the present invention provides methods to interpret movement of centroid of marker to determine displacement and direction of movement of cursor as also double click action by user.

In yet another embodiment, the disclosure provides for restricting movement of cursor and/or pointer within various options displayed on monitor/screen of interface unit, making it easier for user to do the selection.

Figure 1:
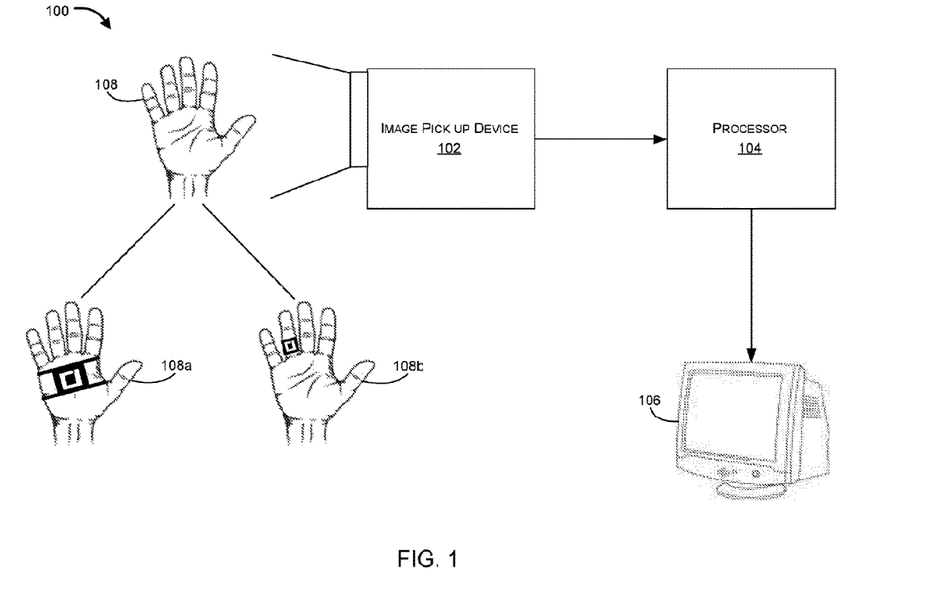
FIG. 1 illustrates an exemplary schematic diagram indicating configuration of the gesture recognition system for emulating mouse in accordance with an embodiment of the present disclosure.

FIG. 1 illustrates an exemplary embodiment of a gesture recognition system 100 having an image pickup/capturing device 102 configured to capture images of user's hand 108. Image capturing device 102 such as a camera can be configured to capture images of hand 108 as it gestures, in multiple frames at predetermined rate (frames per second). The image capturing device 102 of gesture recognition system 100 can be a commercially available web camera or any other video camera. The image capturing device 102 can be in communication with a processor 104 and can be configured to transfer captured images to processor 104 in real time. The processor 104 can be configured to process the transmitted images and interpret gestures and feed corresponding commands to machine 106 with which the processor 104 is operatively coupled to. The machine 106 can be a computer that user wants to interact with using intuitive hand gestures for input of commands.

According to one embodiment, a marker can be configured on the hand 108 of the user to act as interface for gesture recognition. The marker 110 can be fixed on a ring 108a worn by user or fixed directly on palm 108b. In an alternative method, the marker 110 can be fixed on a stretchable band of suitable size, which can be put by user around his/her palm. In yet another method of configuring marker 110 on user, the same can be fixed on a cap like structure of appropriate size for wearing on fingertip, in which case user can move the finger in front of image capturing device 102 to gesture and interact with machine. One should appreciate that any other mode/method/construction of marker 110 can be envisaged and configured to be operatively coupled on/with/to the user.

In an embodiment of application user can hide the marker such as by folding his fingers over marker placed on palm or to bring it out of view of image capturing device 102 when the marker is configured on finger, to block operation of gesture recognition and suspend input of commands to machine 106.

It should be understood that illustration in FIG. 1 is only exemplary and various devices shown there can be configured in many different ways depending on machine, convenience of user or type of equipment used. For example, it can be possible to configure both image capturing device 102 and processor 104 within the machine, making the system 100 more compact and capable of interacting with users through gestures. Within the machine, the image capturing device 102 can be configured on right and/or left side to meet varying requirements of right handed or left handed users. Still another configuration can have a detachable image capturing device that can be fixed at different places depending upon user's convenience and preference.

Figure 2:
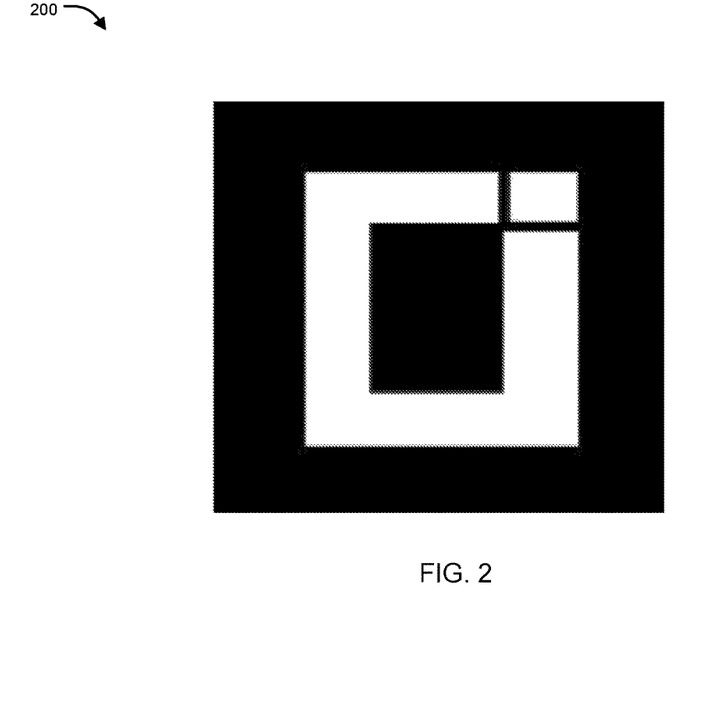
FIG. 2 illustrates an exemplary marker used with gesture recognition system for emulating mouse in accordance with an embodiment of the present disclosure.

FIG. 2 illustrates an exemplary marker 200 for use as gesture interface in accordance with embodiments of present disclosure. The marker 200 can be rectangular in shape and can incorporate any pattern in different colors. It can be of appropriate size to be suitable for method of configuration on user's hand. It can be painted directly on the ring or printed or painted on cloth/paper that can be fixed on elastic band to be worn on palm. It should be understood that various configurations of marker 200 are possible without limitation of shape or size or material or color or method of configuring on user's hand and all are within the scope of present disclosure.

Figure 3:
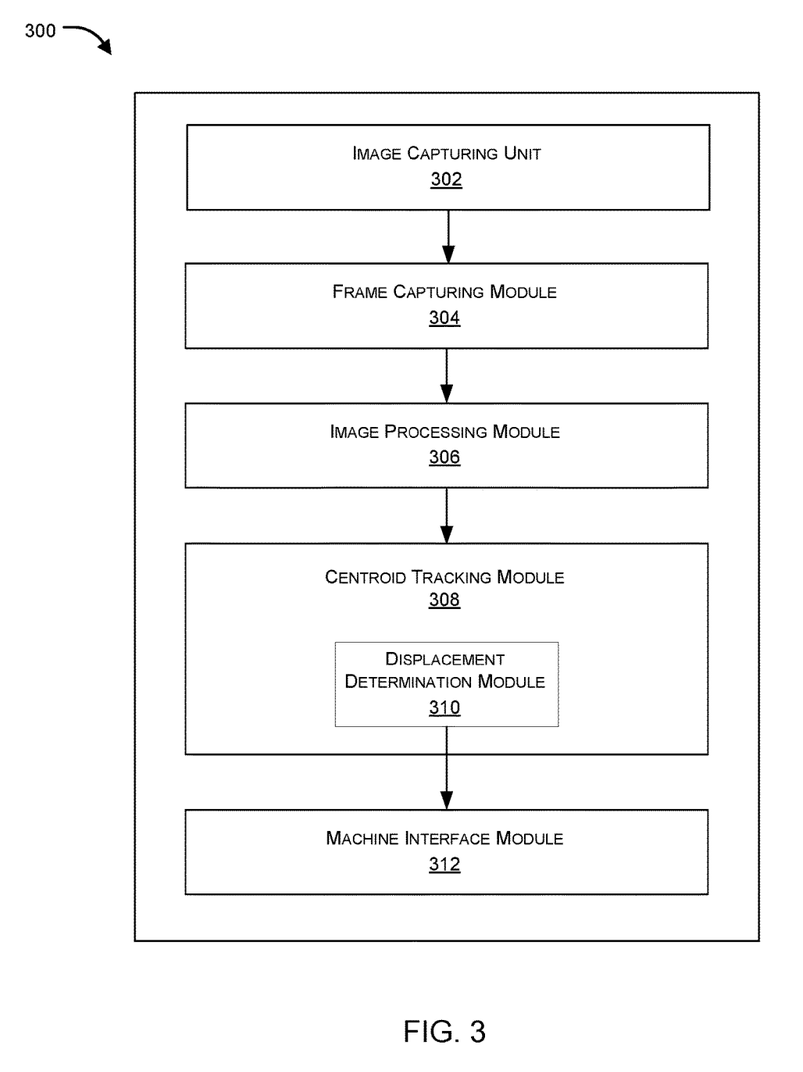
FIG. 3 illustrates a schematic diagram of functional modules of gesture recognition system for emulating mouse in accordance with an embodiment of the present disclosure.

FIG. 3 illustrates various functional modules of system 300 for gesture recognition and sending commands to a machine. Image capturing unit 302 can capture images at predefined intervals in continuous stream. The image capturing unit 302 can be a commercially available web camera or any other video camera. The image capturing unit 302 is in communication with frame capturing module 304 and sends the captured images in real time to frame capturing module 304.

In an embodiment of present disclosure, the frame capturing module 304 can be configured to store a set of consecutive frames of images out of continuous stream from the image capturing unit 302, and transmit them in real time/or at periodic intervals to image processing module 306. In an alternate embodiment, frame capturing module 304 can also be configured to store the frames as and when desired/defined/configured. A set can include N number of frames. In another embodiment of present disclosure, image processing module 306 can be configured to process images contained in these frames to determine location of centroid of marker 200. Processing module 306 can process these images in accordance with image processing algorithm details of which shall be disclosed in subsequent paragraphs. Position of centroid for the N frames can be saved and communicated to tracking module 308. In an implementation, position of the centroid can be stored such that negligible movements of the marker can be ignored.

In another embodiment of present disclosure, tracking module 308 can be configured to, based on position of centroid of marker 200, calculate displacement of the marker 200. Position of centroid for N frames can be processed in displacement determination module 310 for determining extent of displacement of the marker. According to one embodiment, displacement of each current frame from the previous frame can be determined, wherein case the displacement is greater than a first defined threshold say $D_{TH1}$, the pointer/cursor on the machine display can be changed accordingly. On the other hand, in case the displacement is lesser than the first defined threshold, the cursor/pointer is not moved. At the end, of say N frame, or any other defined number of frame, total displacement can be computed between the $1^{st}$ frame and the $N^{th}$, wherein in case the total displacement is lesser that a second defined threshold say $D_{TH2}$, a double click action can be determined, else in case the total displacement is greater that a second defined threshold say $D_{TH2}$, get another frame and repeat the process.

Machine interface module 314 can, upon getting displacement data, communicate with machine 106 for change in machine display in accordance with user's gestures. In an embodiment of application machine interface module 314 can limit movement of cursor within available selectable options. For example, in a web page or any software display displaying a list of languages for selection by user, the cursor/pointer movement can be limited to boxes or windows indicating these languages. Therefore, even if the user's hand moves in a direction where there is no selection box, the display pointer cannot move in that direction thereby making the human machine interface easy. Even if the pointer moves, the pointer can be approximated to the closest selectable option, to ease the working of the software application by means of the proposed marker.

In another embodiment, with the calculation for displacement and direction being based on N number of image frames, movement of the display pointer can take place in discrete (in space) manner, i.e. the pointer/cursor can move at particular locations on the screen according to the marker position in the frames.

Figure 4:
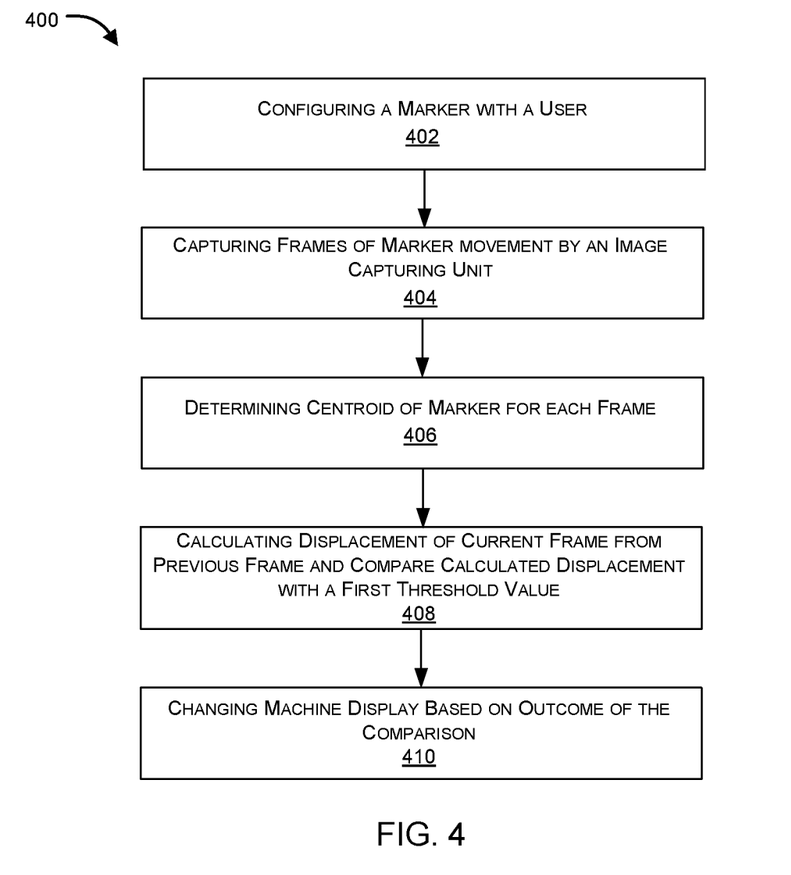
FIG. 4 illustrates an exemplary process flow diagram for gesture recognition method using a marker for gesture interface in accordance with an embodiment of the present disclosure.

FIG. 4 illustrates a process flow diagram 400 for a method of gesture recognition using a marker for gesture interface in accordance with embodiments of present disclosure. At step 402, a marker 200 can be configured with a user, wherein the marker can be fixed on a ring 108a to be worn by user or can be fixed directly on palm 108b or any other means can be used to operatively couple the marker with the user/hand. In an alternative method, marker can be fixed on a stretchable band of suitable size which can be put by user around his palm or it can be fixed on a cap like structure of appropriate size for wearing on fingertip, in which case user can move the finger in front of image capturing device 102 to gesture and interact with machine. The marker 200 can be in rectangular/circle/square/any other desired/configured/defined shape, and can incorporate any pattern in different colors. It can be of appropriate size to be suitable for a method of configuration on user's hand. It can be painted directly on the ring or fingertip cap or printed/painted on cloth/paper that can be fixed on elastic band to be worn on palm.

At step 404, an image capturing unit 102 captures consecutive frames of images of marker as user makes intuitive hand gestures for communicating with machine. For example, if user wants to move cursor up, he/she can move his hand up and vice-versa. Likewise, if he wants to move cursor to right he can move his hand to right. Thus, movement of hand as part of gesture is in same direction as desired direction of cursor movement making it intuitive. The image capturing device 102 can be a commercially available web camera or any other video camera which is capable of capturing images of user's hand/marker configured on user's hand at predetermined intervals/frame rate (frames/second).

At step 406, captured images can be processed for determining centroid of marker 200 in each of these frames for subsequent of marker 200. In an embodiment, images can be processed in accordance with image processing algorithm, which has been explained in subsequent paragraph.

At step 408, displacement of a current frame from a previous frame can be compared with a threshold displacement value $D_{TH1}$, wherein in case the displacement is smaller than $D_{TH1}$, the cursor is not moved, else the cursor can be moved and, in an implementation, the centroid history can also be deleted. In another embodiment, in case the marker does not move for more than a second threshold displacement value $D_{TH2}$, for N number of frames, a double click can be understood and implemented/incorporated. One should appreciate that any of frames can be taken into consideration before taking a decision as to whether to interpret an action as a double click action. Furthermore, any action, apart from the stationery hand can also be construed/implemented as to be interpreted as a double click action.

At step 410, determined position of the cursor can be used to select the corresponding item on the display. A multiplication factor can be used to map camera resolution and monitor resolution so that gestures cover entire monitor. Thus, a multiplication factor can be applied to calculated centroid position before sending command to machine to change machine display.

Figure 5:
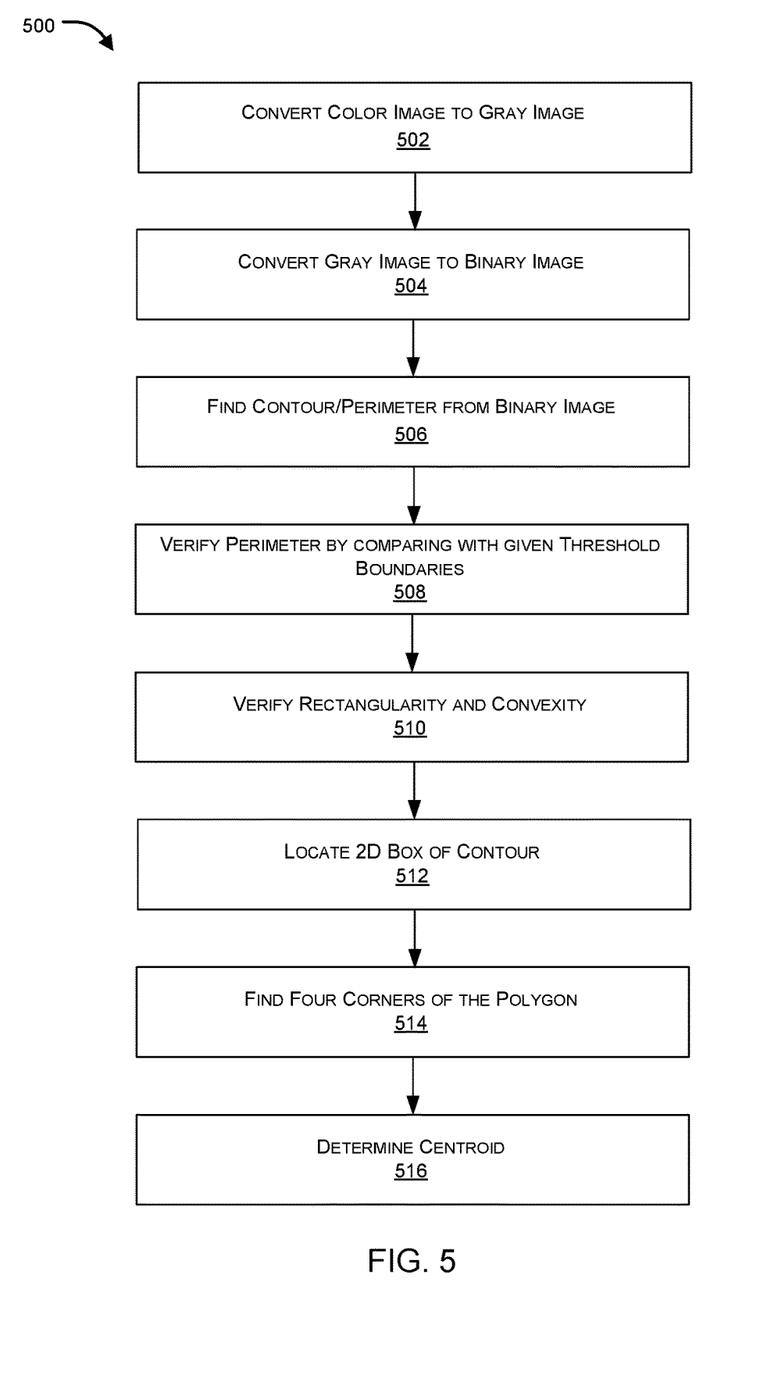
FIG. 5 illustrates an exemplary flow diagram for image processing for determination of centroid of marker in accordance with an embodiment of the present disclosure.

FIG. 5 illustrates an image processing flow diagram 500 to compute centroid of a marker 200 in accordance with an embodiment of the present disclosure. At step 502, colored/black-white image of marker 200 can be captured by the image capturing device 102 and converted into gray image, wherein the gray image, at step 504, can be converted into a binary image containing only 0's and 1's, after which, at step 506, the binary image can be used to determine boundaries or perimeter of the marker 200. Thereafter, at step 508 boundaries can be verified with reference to a defined/given threshold. At step 510, rectangularity and/or convexity can be assessed, wherein if the verification requirements are met, 2D box of contour of rectangle can be located at step 512, and therefore, at step 514, four corners of polygon can be located, which at next step 516, can be used to determine center and/or centroid of marker 200 defined by rectangular polygon.

Figure 6:
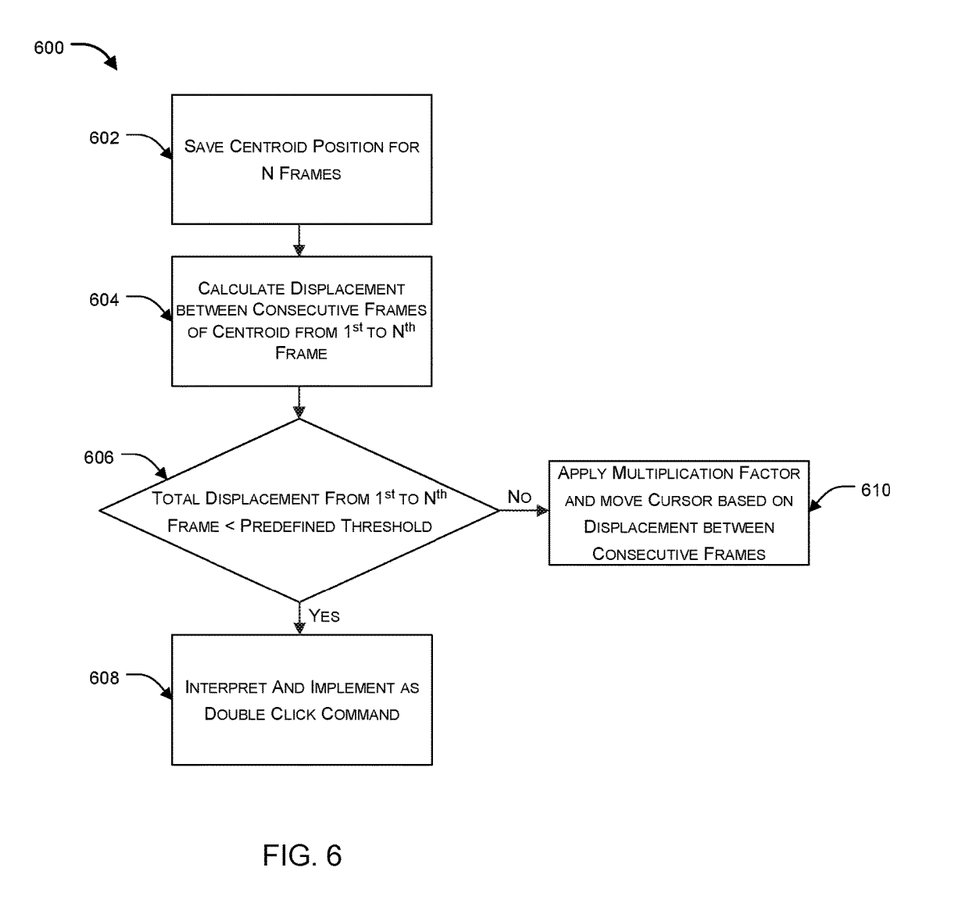
FIG. 6 illustrates an exemplary flow diagram for displacement determination and double click interpretation in accordance with an embodiment of present disclosure.

FIG. 6 illustrates an exemplary flow diagram 600 for displacement determination and double click identification in accordance with embodiments of present disclosure. At step 602, centroid position for N frames can be recorded and saved. At step 604, displacement in the computed centroid can be calculated based on position of centroid in $1^{st}$ and $N^{th}$ frame. At step 606, it is checked as to whether the total displacement of the marker between the $1^{st}$ and the $N^{th}$ frame is lower than a defined double click threshold, say $D_{TH2}$, wherein, at step 608, if the displacement is lower that the threshold $D_{TH2}$, it can be interpreted as a double click gesture and corresponding command can be sent to machine. At step 610, on the other hand, in case the displacement is greater than the threshold $D_{TH2}$, it can be interpreted as normal marker movement, and the same can be implemented as explained with reference to FIG. 4. One should appreciate that the conditions used for interpreting double click or displacement are completely exemplary in nature, and any other condition can be incorporated. For instance, instead of evaluating/determining/confirming of double click after there is no predefined displacement for N frames, such double click can be confirmed after there is no predefined displacement for 2N frames, 3N frames, or 4N frames or any other desired time period. Any other condition such as movement of a defined finger in a specified way can also be considered as double click. Similarly, movement of the index finger in a defined way can be construed as scroll action. Therefore, any other action and way of detection thereof using the proposed marker 200 is completely within the scope of the instant disclosure.

Figure 7:
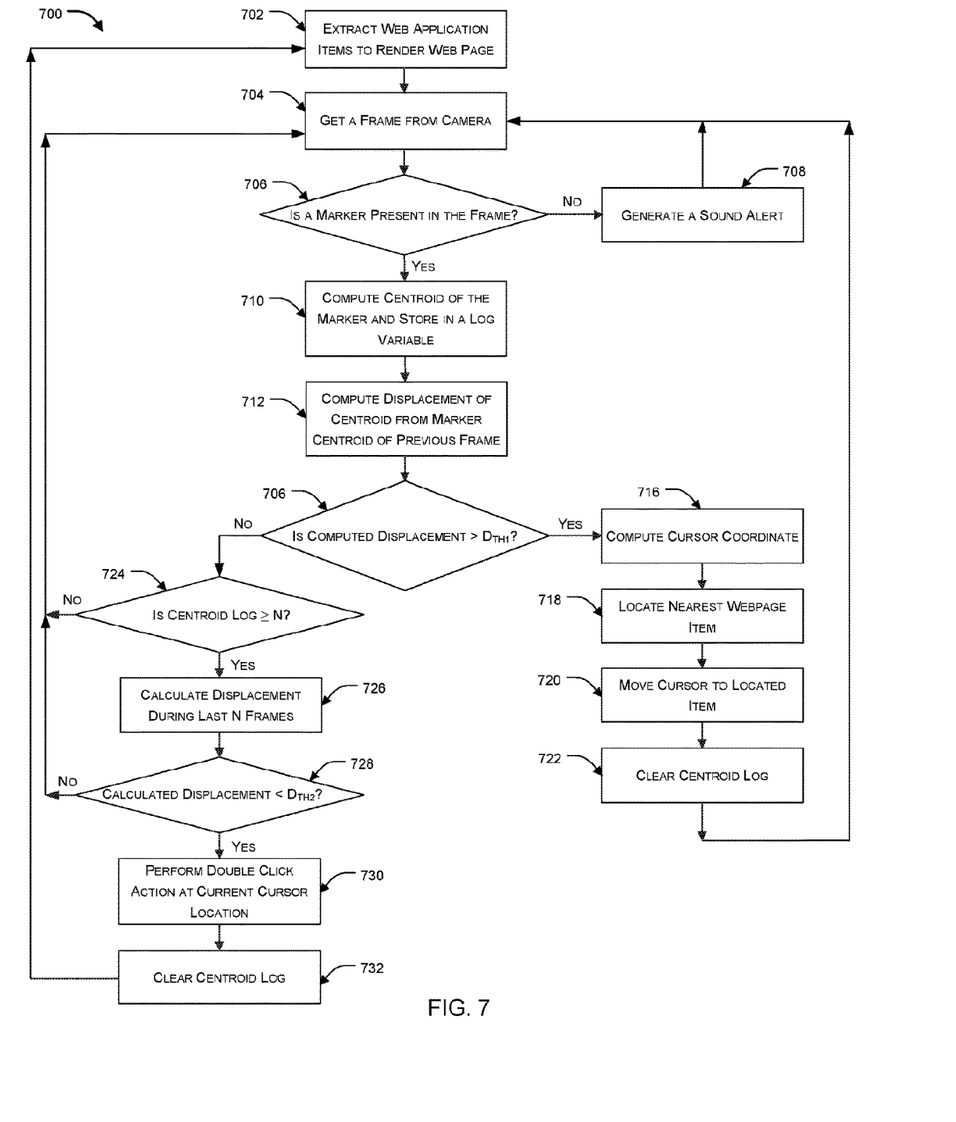
FIG. 7 illustrates another exemplary flow diagram for computing and processing displacement of centroid of marker between frames to interpret actions on machine display in accordance with an embodiment of present disclosure.

FIG. 7 illustrates another exemplary flow diagram 700 for computing and processing displacement of centroid of marker between frames to interpret actions on machine display in accordance with an embodiment of present disclosure. At step 702, a web-based application to be used by a user, can be selected/executed to extract necessary/desired webpage items. At step 704, a image frame from a camera can be retrieved, and at step 706, it can be evaluated as to whether a marker is present in the retrieved frames, wherein in case there is no marker present, at step 708, a sound alert can be generated and the method 700 can move back to step 704 for retrieving another image frame.

At step 710, in case the marker is present, centroid of the marker can be calculated and optionally, stored in a log variable. At step 712, displacement of the centroid from the previous frame's marker centroid can be calculated, and at step 714, it is determined whether the displacement is greater than a first defined threshold $D_{TH1}$. At step 716, in case it is determined that the displacement is greater than $D_{TH1}$, a new cursor/pointer coordinate can be calculated, and at step 718, a nearest webpage item location can be found out. At step 720, the cursor can be moved to the found webpage item location, and at step 722, the centroid log/history can be cleared.

In case, at step 714, it is determined that the displacement is lower than $D_{TH1}$, it is, at step 724, determined whether the centroid log size is greater than or equal to N, wherein in case the centroid log size is not greater than or equal to N, the method can move back to step 704, and in case the centroid log size is greater than or equal to N, at step 726, displacement is calculated during the last N frames. At step 728, it is determined whether the displacement calculated in step 726 is lower than a second defined threshold $D_{TH2}$ such that if the displacement is greater than the second defined threshold $D_{TH2}$, the method can move back to step 704, else, at step 730, a double click action can be performed at the current cursor location, and step 732, optionally, the centroid log can be cleared and the method can move back to step 702 or can end.

In an embodiment of the present disclosure, a multiplication factor is used to map camera resolution and monitor resolution so that gestures cover entire monitor. Thus, a multiplication factor can be applied to calculated centroid displacement before sending command to machine to change machine display.

The above description represents merely an exemplary embodiment of the present invention, without any intention to limit the scope of the present invention thereto. Various equivalent changes, alterations or modification based on the present invention are all consequently viewed as being embraced by the scope of the present invention.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

The present disclosure overcomes problems associated with methods of gesture recognition using hand segmentation techniques.

The present disclosure provides a method for gesture recognition for mouse emulation for human machine interface.

The present disclosure provides a method for gesture recognition for mouse emulation with discrete cursor movements only to designated positions on the screen.

The present disclosure provides method for gesture recognition using a marker as gesture recognition interface.

The present disclosure provides a method for mouse emulation for human machine interface using intuitive marker gestures providing proper feedback to the user.

We claim:
1. A method of generating a gesture recognition, the method comprising steps of:
  arranging a user-configurable physical marker associated with a user;
  capturing N frames of marker movement by an image capturing unit;
  capturing an image of said physical marker using said image capturing unit, wherein said captured image is a color image,
  determining a centroid of said physical marker for one or more of said N frames by the following operations:
    converting said image into a binary image, wherein said color image is converted into a gray image before converting into said binary image;
    identifying a boundary of said physical marker from said binary image;
    verifying rectangularity and/or convexity of said identified boundary to determine corners of said binary image; and
    determining the centroid of said physical marker from said determined corners; and
  determining displacement of said centroid for said one or more of said N frames; and
  generating a movement of a pointer on a display based on said determined displacement of said centroid, the movement of the pointer representing the gesture recognition associated with the user.

2. The method of claim 1, further comprising a step of computing displacement of a current frame from a previous frame, and incorporating said movement of said pointer if said computed displacement is greater than a defined first threshold value.

3. The method of claim 1, further comprising a step of computing total displacement between first frame and $N^{th}$ frame, and interpreting action as a double click action when said computed total displacement is lower than a defined second threshold value.

4. The method of claim 1, wherein said physical marker is operatively coupled with a hand of said user, and wherein any defined characteristic comprising one or more of shape, size and/or type of said physical marker is incorporated.

5. The method of claim 1, wherein said marker is configured as a finger ring so as to be fitted on a finger of a user.

6. The method of claim 1, wherein movement of said pointer is discrete.

7. The method of claim 1, wherein placement of said marker outside the range of said image capturing unit is alerted in real-time to said user to enable said user to bring said marker within said range of said image capturing unit.

8. The method of claim 7, wherein said alert is based on an audio-visual signal being presented to said user.

9. The method of claim 1, wherein said marker is configured to move in a restricted manner so as to move only along selectable options on said screen of said display.

10. A system of generating a gesture recognition associated with a user, the system comprising:
    a frame capturing unit configured to capture and store a plurality of image frames of a user-configurable physical marker associated with a user, wherein said captured image is a color image;
    an image processing module configured to:
        convert said color image into a gray image before converting into a binary image;
        identify a boundary of said physical marker from said binary image;
        verify rectangularity and/or convexity of said identified boundary to determine corners of said binary image; and
        determine a centroid from said determined corners;
    a centroid tracking module configured to:
        compute a centroid position of said physical marker for one or more of said image frames; and
    a displacement determination module configured to compute displacement between a centroid of a current frame and a centroid of a previous frame, wherein said displacement determination module is further configured to enable movement of a cursor or pointer on a display when said computed displacement is greater than a first threshold value.

11. The system of claim 10, wherein said system is used for automation of selection of one or more items of a webpage.

* * * * *